United States Patent [19]

Sichel

[11] 4,110,259
[45] Aug. 29, 1978

[54] ELECTROCHROMIC CERMET MATERIAL AND DEVICE INCLUDING THE SAME

[75] Inventor: Enid Keil Sichel, East Windsor, N.J.
[73] Assignee: RCA Corporation, New York, N.Y.
[21] Appl. No.: 806,716
[22] Filed: Jun. 15, 1977

Related U.S. Application Data

[63] Continuation-in-part of Ser. No. 783,653, Apr. 1, 1977.
[51] Int. Cl.² .............................................. H01B 1/02
[52] U.S. Cl. ................................... 252/514; 350/357; 252/300; 428/539.5
[58] Field of Search .............................. 252/514, 300; 350/160 R; 428/539.5; 75/232, 247

[56] References Cited

U.S. PATENT DOCUMENTS

| | | | |
|---|---|---|---|
| 3,521,941 | 7/1970 | Deb et al. ........................ | 350/160 R |
| 3,827,784 | 8/1974 | Giglia et al. ...................... | 350/160 P |
| 3,940,205 | 2/1976 | Crandall et al. ................. | 350/160 R |
| 4,009,935 | 3/1977 | Faughnan et al. ............... | 350/160 R |
| 4,053,209 | 10/1977 | Hara et al. ....................... | 350/357 |

Primary Examiner—Benjamin R. Padgett
Assistant Examiner—E. Suzanne Parr
Attorney, Agent, or Firm—Eugene M. Whitacre; Donald S. Cohen

[57] ABSTRACT

An electrochromic display device includes a cermet electrochromic film. The cermet may comprise a conventional electrochromic material, such as tungsten oxide, and a noble metal, such as gold. In a preferred embodiment, the electrochromic cermet material includes a metal content of about 25 atomic percent. The electrochromic cermet is blue as prepared, and, when colored, is red. This electrochromic cermet material can be used in combination with other electrochromic materials, such as tungsten oxide, so as to result in a multicolor electrochromic display.

18 Claims, 3 Drawing Figures

ELECTROCHROMIC CERMET MATERIAL AND DEVICE INCLUDING THE SAME

BACKGROUND OF THE INVENTION

The invention herein described was made in the course of or under a contract or subcontract thereunder with the Department of the Air Force.

This is a continuation-in-part of my copending application, Ser. No. 783,653, filed Apr. 1, 1977, entitled "Electrochromic Cermet Material And Device Including The Same".

The present invention relates to an electrochromic material and device including the same, and particularly to an electrochromic cermet material.

Electrochromic devices are well-known devices which exhibit a phenomenon known as "persistent electrochromism," e.g., see U.S. Pat. No. 3,521,941 entitled "Electro-Optical Device Having Variable Optical Density," issued July 28, 1970. The term "persistent electrochromism" denotes the property of a material whereby its electromagnetic radiation absorption characteristics can be altered, in most instances, even at ambient temperature. Generally, in order to alter the absorption characteristic, an electric field is provided such that an electric current flows through the electrochromic material. Such materials, for example, may exhibit little or no absorption of visible wavelength in the unswitched state, and therefore be transparent, but when subjected to an electric switching current, effectively absorb in the red end of the spectrum, turning blue in color. Typically, the electrochromic materials, such as tungsten oxide or molybdenum oxide, are prepared as film layers on a substrate through conventional techniques such as evaporation or sputtering.

Heretofore, the widespread use of electrochromic display devices has been discouraged by several problems. One problem is that electrochromic materials are not available in a variety of colors; most displays are blue or near blue. Thus, it would be desirable to develop an electrochromic material which offers additional color possibilities.

SUMMARY OF THE INVENTION

An electrochromic cermet material includes an electrically insulating electrochromic material and a metal. The electrochromic cermet material is useful in an electrochromic display device of the type having an electrochromic film and means for coloring the film.

DETAILED DESCRIPTION OF THE INVENTION

The present invention is directed toward electrochromic cermet materials and devices including the same. The electrochromic cermet material typically includes: a noble metal, such as gold, silver, or platinum; and an insulating electrochromic material, such as tungsten oxide. Noble metals are preferred because, if oxygen is present during electrochromic film preparation, other metals may oxidize. The presence of the oxidized metal is undesirable as it may interfere with the metal aggregation process in the cermet.

As herein employed, by the term an electrochromic cermet material, it is meant a material which includes metal atoms aggregated into particles with the particles being dispersed in an insulating matrix. Thus, for example, in the Au–WO$_3$ cermet, the metal is Au and the insulating matrix is WO$_3$. The cermet material of the present invention includes metal particles which are typically greater than 10Å in diameter. For example, transmission electron micrographs of Au–WO$_3$ cermets of the present invention showed gold grains ranging in size from 10Å to 120Å. Thus, the cermet metal particles are much larger than the metal atoms in an atomic dispersion of a metal in an insulating matrix where the resultant nonaggregated metal atoms are atomic size, i.e., less than 3Å in diameter.

Figure 1:
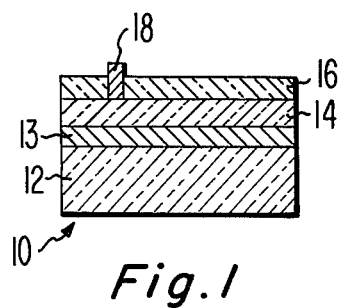
FIG. 1 is a cross-sectional view of one form of an electrochromic display device of the present invention.

Referring now to FIG. 1, an electrochromic device of the present invention is generally designated as 10. The electrochromic device 10 includes a transparent substrate 12, such as glass, having on a surface thereof a conductor layer 13, which may be transparent, such as tin doped indium oxide. On the conductor layer 13 is a film 14 of electrochromic cermet material of the present invention, such as Au–WO$_3$ cermet, 25 atomic percent Au. The electrochromic cermet film 14 is about 2000Å thick. An electrolyte 16, such as 5 volume percent sulfuric acid, is on the film 14 of electrochromic cermet material. The electrolyte 16 can be in the form of a gel as in U.S. Pat. No. 3,708,220 entitled "High Conductivity Electrolyte Gel Materials," issued Jan. 2, 1973 to Meyers et al.

The electrochromic device 10 includes an electrode 18 of a material which is capable of forming positive ions in the electrolyte 16 and also capable of injecting electrons into the film 14 of electrochromic materials. Suitable materials include indium, iron and magnesium, with indium being preferred.

Coloration occurs in the electrochromic film 14 of the device 10 of FIG. 1 when the electrode 18 contacts the electrochromic cermet film 14. Further information on the coloration process as well as suitable electrode materials can be found in U.S. Pat. No. 3,940,205, issued Feb. 24, 1976, to Heyman et al., entitled, "Electrochromic Display Device."

Figure 2:
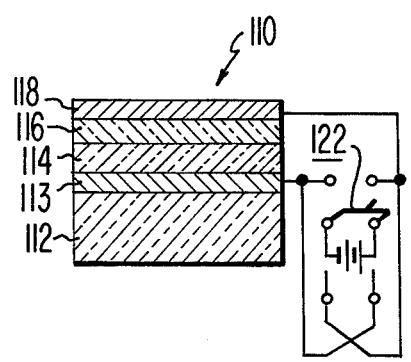
FIG. 2 is a cross-sectional view of another form of an electrochromic display device of the present invention.

Referring now to FIG. 2, another form of an electrochromic device of the present invention is generally designated as 110. The electrochromic device 110 includes a transparent substrate 112, such as glass, having on a surface thereof a conductor layer 113 which may be transparent, such as tin doped indium oxide. A film 114 of electrochromic cermet material of the present invention having a thickness of about 2,000Å is on the conductor layer 113. The film 114 of electrochromic cermet material comprises Au–WO$_3$ cermet, 25 atomic percent Au. An electrolyte 116, such as 5 volume percent sulfuric acid, is sandwiched between the film 114 of electrochromic cermet material and an electrode 118. The electrode 118 corresponds to the electrode 18 of FIG. 1 and, as previously described, may be of a material such as indium.

In the operation of the electrochromic device 110 of FIG. 2, a conventional biasing voltage is applied. For example, a network 122 enables one to reverse the biasing as desired wherein one biasing will produce coloration in the electrochromic cermet film 114 while opposite polarity will cause bleaching of the electrochromic cermet film as is known in the art. For example, when the electrode 118 is positive with respect to the conductor layer 113, coloration occurs. When the electrode 118 is negative with respect to the conductor layer 113, bleaching occurs.

Figure 3:
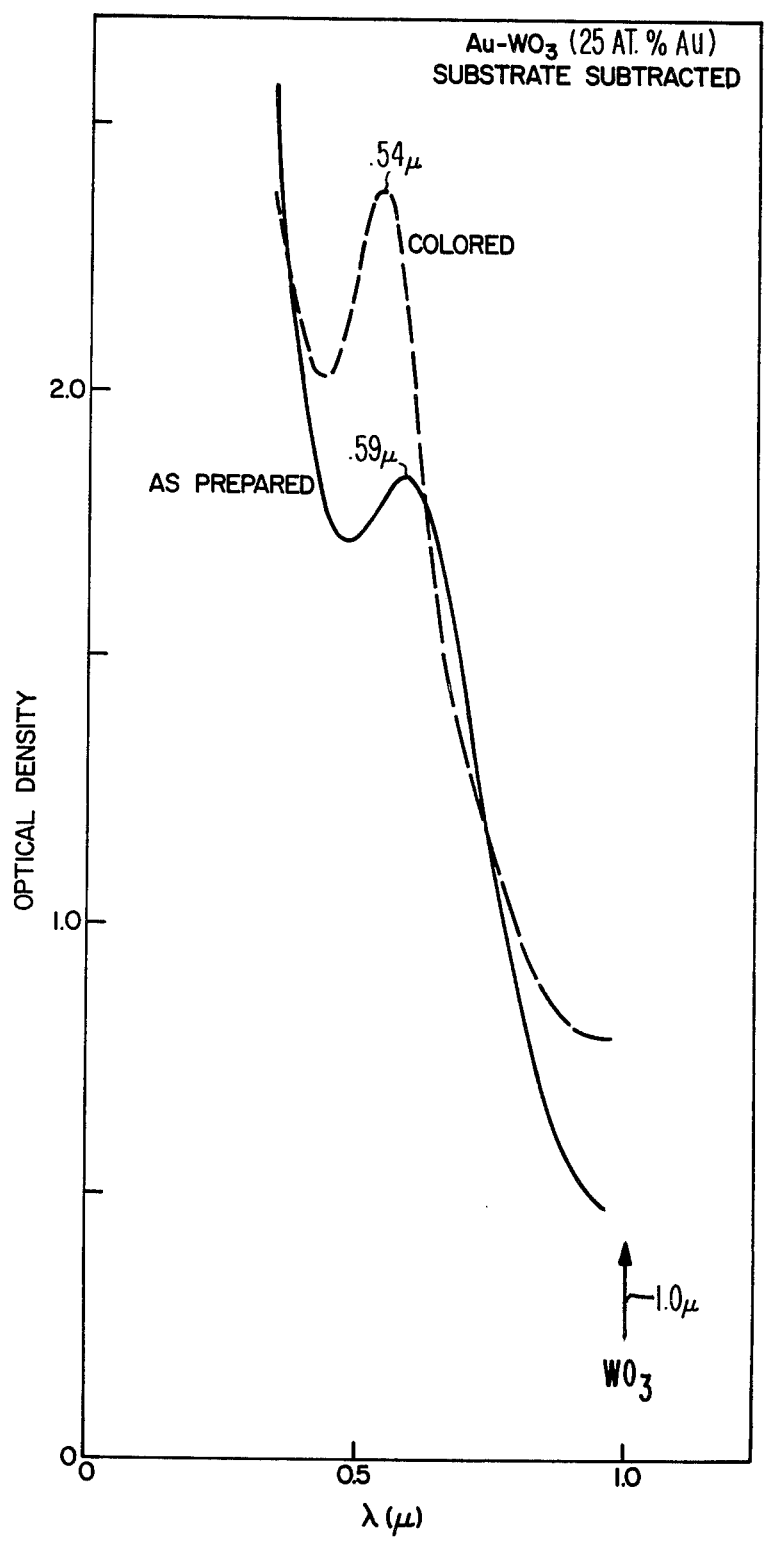
FIG. 3 is a graph showing the optical density of an electrochromic cermet film of the present invention (Au–WO$_3$, 25 atomic % Au) as a function of the wavelength of the incident light. Also shown on the graph is the approximate peak of a conventional WO$_3$ film.

A significant advantage of the electrochromic cermet material and electrochromic devices of the present invention is the additional color possibilities afforded. For instance, when the previously described electrochromic devices of the present invention are colored, the resulting color in the Au–WO$_3$ electrochromic cermet material is red. This is in contrast to the conventional blue electrochromic coloration. This coloration difference between the electrochromic cermet film of the present invention and conventional electrochromic films, such as WO$_3$, can be further appreciated by referring to FIG. 3 where the optical density of a 2000Å thick electrochromic cermet film of the present invention (AuWO$_3$, 25 atomic%Au) is shown as a function of the wavelength of the incident light. The data for the electrochromic cermet film of FIG. 3 was obtained through the use of a Cary 14 spectrometer with the presence of the substrate subtracted. As shown in FIG. 3, the optical density peaks for the cermet material are: uncolored (light blue) at 5900Å; colored (red) at 5400Å. These peaks are quite different from the absorption band of conventional WO$_3$ which generally peaks near 8000Å (0.8 μm) or 14000Å (1.4 μm), depending upon the crystallinity of the film. For further information on the absorption characteristics of conventional electrochromic films, such as WO$_3$, see S.K.Deb. Phil. Mag. 27 801 (1973).

A preferred technique for preparing the electrochromic material of the present invention includes depositing, e.g., sputtering, the electrochromic cermet material onto a substrate. Typically, the substrate comprises a glass plate which has been coated with tin doped indium oxide. The sputtering target may comprise WO$_3$ in the form of a hot-pressed powder disk, typically 3 inches in diameter. On top of the WO$_3$ disk is placed a small metal disk which represents the metal constituent in the resultant electrochromic cermet. Typically, the metal disks range in diameter from about ⅛ to 1 inch. The relative concentration of the metal and WO$_3$ in the resultant cermet may be varied by changing the size of the metal disk and by changing the location of the substrate relative to the metal disk. This technique is more completely described by Hanak et al. in Journal of Applied Physics, 43, 1666 (1972). During the sputtering process, a controlled oxygen leak of $1.2 \times 10^{-3}$ to $2.9 \times 10^{-1}$ torr in an argon pressure of $5 \times 10^{-2}$ torr is maintained in order to prevent the formation of suboxides of tungsten. During this sputtering, the substrate temperature is typically about 100° C.

Several films of electrochromic cermet material were prepared on a tin doped indium oxide coated glass plate. The films were prepared in accordance with the preferred technique discussed above. Each of the cermet films was deposited in a manner so as to have a composition gradient along the long axis of the plate where one end is almost 100% WO$_3$ with increasing metal content from that end. In this manner, a continuous range of metal-WO$_3$ concentrations can be sampled from one film. The films had a thickness of about 2000Å. The properties of these films are shown below in Table I. The compositions of films 1 and 2 were determined by compositional analysis. The composition of the film designated with an asterisk (*) was determined by an estimate. The estimate was made by comparing the sputtering yield of the platinum with the sputtering yield of Au. The films were colored by at least one of the following techniques:

1. A puddle of 5 volume percent H$_2$SO$_4$ was placed on top of the film and an indium wire was touched to the film surface through the acid (see FIG. 1); and
2. A puddle of 5 volume percent H$_2$SO$_4$ was placed on top of the film and an indium wire was dipped into the acid without touching the film surface. A positive voltage of 1–3 volts was applied to the indium and the circuit was completed to the tin doped indium oxide. In this technique, reversing the voltage bleaches the electrochromic material (see FIG. 2).

Table I

| | Electrochromic Cermet Material | Coloration as Prepared | Observed Coloration (Coloring Method) | Observed Bleaching |
|---|---|---|---|---|
| 1. | AuWO$_3$ (4–40 atomic % Au) | Pale Blue | Red (1,2) | Pale Blue |
| 2. | Ag-WO$_3$ (3–17 atomic % Ag) | Blue-Violet | Grey-Blue (1) | — |
| 3. | Pt-WO$_3$ (0–40 atomic % Pt)* | Yellow | Blue (1) | — |

GENERAL CONSIDERATIONS

Although the electrochromic cermet material and electrochromic device of the present invention have been heretofore described as including specific metal and insulator constituents, variations are possible in which other materials are substituted therefor, or added thereto. As a general rule, however, the metal should be one which does not oxidize easily and does not react chemically with the insulator. The insulator should be one which is electrochromic. Among these variations are the following: Au-Mo$_3$; Ag-MoO$_3$; Pt-MoO$_3$; W-WO$_3$; W-MoO$_3$; Mo-MoO$_3$; Au-(MoO$_3$ + WO$_3$); Ag-(MoO$_3$ + WO$_3$); Pt-(MoO$_3$ + WO$_3$); W-(MoO$_3$ + Wo$_3$); and Mo-(MoO$_3$ + WO$_3$).

Generally, with regard to the Au-Wo$_3$ electrochromic cermet, the preferred metal content is about 25 atomic percent for electrochromic film thicknesses of 2000Å. It has been observed that lower metal contents result in a pinkish coloration instead of red coloration. Higher metal contents may create high reflectivity, thereby diminishing the ability of a viewer to appreciate the coloration. It is to be noted that, for film thicknesses greater than 2000Å, the metal content is preferably less than 25 atomic percent due to the increased optical density exhibited by the thicker film.

Electrochromic devices employing the electrochromic cermet material of the present invention may include other available electrode structures and/or materials such as the WO$_3$ graphite electrode of U.S. Pat. No. 3,827,784, issued Aug. 6, 1974 to Giglia et al., entitled "Simple, Bonded Graphite Counter Electrode for Electrochromic Devices."

Also, although the preparation of the electrochromic material preferably includes sputtering techniques, other deposition techniques may be substituted. For example, the electrochromic cermet may be evaporated onto the substrate.

I claim:

1. An electrochromic cermet material, which consisting essentially of
   an electrically insulating electrochromic material, and
   particles of a noble metal which are greater than about 10Å in diameter.

2. An electrochromic cermet material in accordance with claim 1 in which said electrochromic material comprises $WO_3$.

3. An electrochromic cermet material in accordance with claim 1 in which said noble metal comprises Au.

4. An electrochromic cermet material in accordance with claim 3 in which said noble metal comprises between 4 to 40 atomic percent.

5. An electrochromic cermet material in accordance with claim 4 in which said noble metal comprises about 25 atomic percent.

6. An electrochromic cermet material in accordance with claim 1 in which said noble metal comprises Ag.

7. An electrochromic cermet material in accordance with claim 6 in which said noble metal comprises between 3 to 17 atomic percent.

8. An electrochromic cermet material in accordance with claim 1 in which said noble metal comprises Pt.

9. An electrochromic cermet material in accordance with claim 8 in which said noble metal comprises between up to 40 atomic percent.

10. An electrochromic device of the type having an electrochromic film and means for coloring said film, wherein said electrochromic material is a cermet which consisting essentially of:
    an electrically insulating electrochromic material; and particles of a noble metal which are greater than 10Å in diameter.

11. An electrochromic device in accordance with claim 10 in which said electrochromic material comprises $WO_3$.

12. An electrochromic device in accordance with claim 10 in which said noble metal comprises Au.

13. An electrochromic device in accordance with claim 12 in which said noble metal comprises between 4 to 40 atomic percent.

14. An electrochromic device in accordance with claim 13 in which said metal comprises about 25 atomic percent.

15. An electrochromic device in accordance with claim 10 in which said noble metal comprises Ag.

16. An electrochromic device in accordance with claim 15 in which said noble metal comprises between 3 to 17 atomic percent.

17. An electrochromic device in accordance with claim 10 in which said noble metal comprises Pt.

18. An electrochromic device in accordance with claim 17 in which said noble metal comprises up to 40 atomic percent.

* * * * *

UNITED STATES PATENT AND TRADEMARK OFFICE
CERTIFICATE OF CORRECTION

PATENT NO. : 4,110,259

DATED : August 29, 1978

INVENTOR(S) : Enid Keil Sichel

It is certified that error appears in the above-identified patent and that said Letters Patent is hereby corrected as shown below:

Col. 3, line 52:   $2.9 \times 10^{-1}$ should be $2.9 \times 10^{-3}$

Col. 5, lines 28 and 29:   delete "be-tween"

*Signed and Sealed this*

*Twentieth* Day of *March 1979*

[SEAL]

Attest:

RUTH C. MASON
*Attesting Officer*

DONALD W. BANNER
*Commissioner of Patents and Trademarks*